(12) United States Patent
Pfoertner

(10) Patent No.: US 8,887,777 B1
(45) Date of Patent: Nov. 18, 2014

(54) TIRE TRACTION UNIT

(71) Applicant: Rolf Pfoertner, Langley (CA)

(72) Inventor: Rolf Pfoertner, Langley (CA)

( * ) Notice: Subject to any disclaimer, the term of this patent is extended or adjusted under 35 U.S.C. 154(b) by 0 days.

(21) Appl. No.: 13/784,383

(22) Filed: Mar. 4, 2013

(51) Int. Cl.
*B60C 27/18* (2006.01)
*B60C 27/06* (2006.01)

(52) U.S. Cl.
CPC .................................... *B60C 27/062* (2013.04)
USPC ...................................... 152/173; 152/213 R

(58) Field of Classification Search
CPC .......... B60C 27/06; B60C 27/16; B60C 27/18
USPC ......... 152/167, 168, 170, 171, 172, 173, 177, 152/178, 179, 185, 185.1, 187, 189, 190, 152/191, 213 R, 221
See application file for complete search history.

(56) References Cited

U.S. PATENT DOCUMENTS

| | | | | |
|---|---|---|---|---|
| 1,463,429 A | * | 7/1923 | Logan | 152/168 |
| 1,871,424 A | * | 8/1932 | Olmstead | 152/221 |
| 1,932,576 A | * | 10/1933 | Dodge | 152/221 |
| 3,092,163 A | * | 6/1963 | Bunker, Jr. et al. | 152/221 |
| 3,770,039 A | * | 11/1973 | Pfoertner | 152/221 |
| 4,280,544 A | * | 7/1981 | White | 152/221 |
| D325,896 S | | 5/1992 | Pfoertner | |
| 5,247,980 A | * | 9/1993 | Haruda et al. | 152/213 R |
| 5,343,610 A | * | 9/1994 | Haruda et al. | 29/525.09 |
| 6,675,850 B2 | * | 1/2004 | Sakuma | 152/221 |
| D643,806 S | | 8/2011 | Yeh | |

FOREIGN PATENT DOCUMENTS

GB    2061201 A   *   5/1981

* cited by examiner

*Primary Examiner* — Kip T Kotter
(74) *Attorney, Agent, or Firm* — Dwayne E. Rogge; Schacht Law Office, Inc.

(57) ABSTRACT

Disclosed herein is a coupling system for a tire traction device comprising: a first wedge block, a second wedge block, a first wedge receiver and a second wedge receiver. In one example, each wedge block includes a surface defining a tie receiver. Also disclosed are first and second wedge receivers. Also disclosed is a tire traction device and a method for producing the tire traction device. The tire traction device removably attached to a vehicle tire or wheel. The traction device in one example comprising: a tread portion comprising a tread surface, the tread portion comprising a first material; a plurality of sidewall portions, the sidewall portions comprising a second material; wherein the tread portion and sidewall portions are cast in a single mold as a unitary structure.

14 Claims, 7 Drawing Sheets

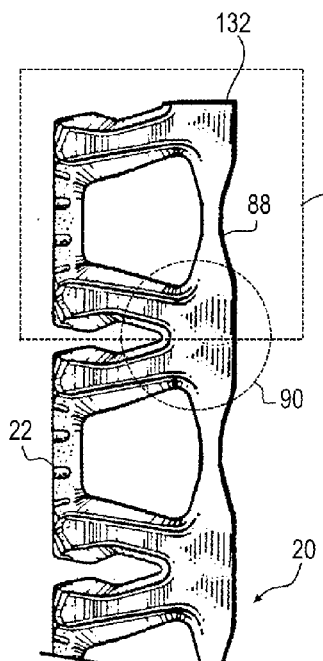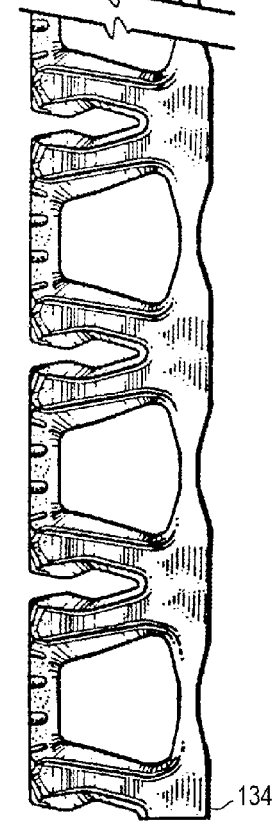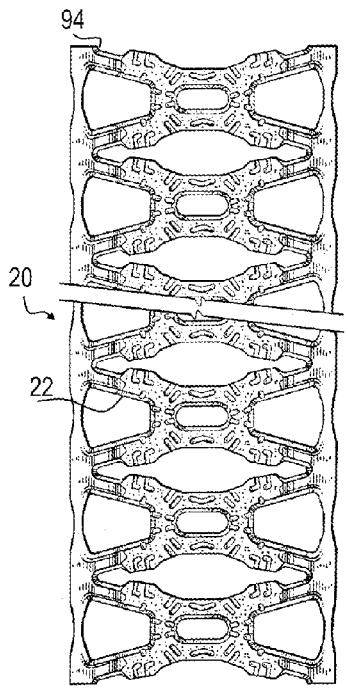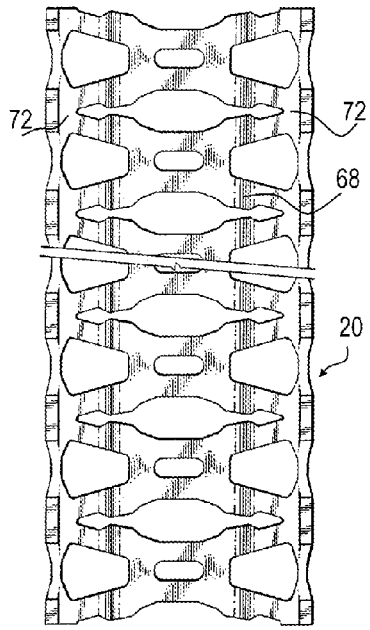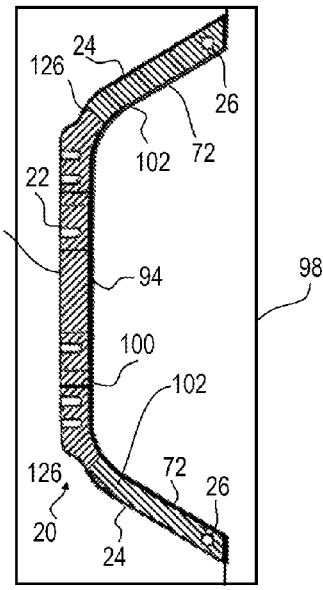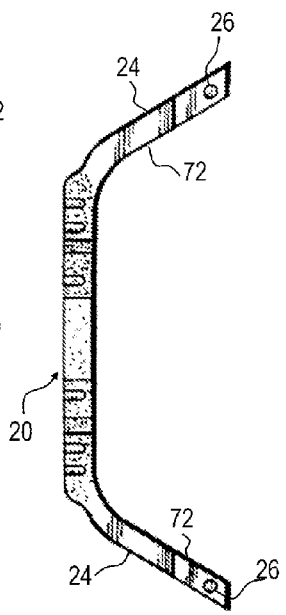
Fig. 4a Prior Art
Fig. 4b Prior Art
Fig. 4c Prior Art
Fig. 14
Fig. 4D Prior Art

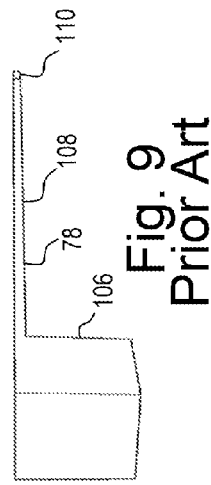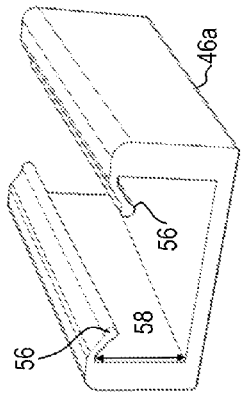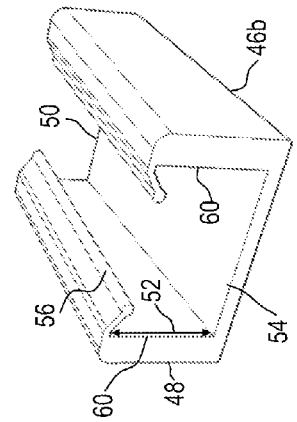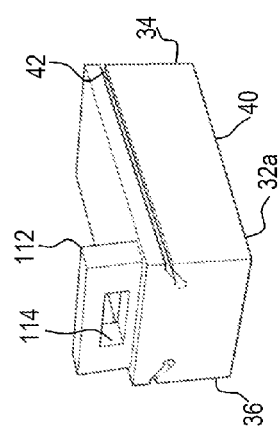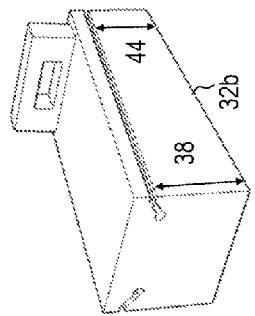

TIRE TRACTION UNIT

BACKGROUND OF THE DISCLOSURE

Field of the Disclosure

This disclosure relates to the field of tire traction devices which are removably attached to the circumference of a vehicle wheel/tire for added traction or wear resistance.

SUMMARY OF THE DISCLOSURE

Disclosed herein is a coupling system for a tire traction device in one example having a tread, sidewall, and sidewall core. The coupling system comprising: a first wedge block having a first longitudinal end having a vertical height and a second longitudinal end having a vertical height wherein the vertical height of the first end is larger than the vertical height of the second end. One example of the first wedge block having a surface defining a tie receiver. Also disclosed is a second wedge block having a first longitudinal end having a vertical height and a second longitudinal end having a vertical height wherein the vertical height of the first longitudinal end is larger than the vertical height of the second longitudinal end. In one example, the second wedge block includes a surface defining a tie receiver. Also disclosed is a first wedge receiver having an internal bottom surface, transversely opposed side surfaces, and transversely opposed projections. The first wedge receiver in one example having a first end longitudinal end and a second longitudinal end wherein the vertical distance between the internal bottom surface and the transversely opposed projections at the first longitudinal end of the first wedge receiver is greater than the vertical distance between the internal bottom surface and the transversely opposed projections at the second longitudinal end of the wedge receiver. A second wedge receiver is also disclosed in one example having an internal bottom surface, transversely opposed side surfaces, and transversely opposed projections. The second wedge receiver of one example having a first end longitudinal end and a second longitudinal end wherein the vertical distance between the internal bottom surface and the transversely opposed projections at the first longitudinal end of the second wedge receiver is greater than the vertical distance between the internal bottom surface and the transversely opposed projections at the second longitudinal end of the wedge receiver.

In one example the coupling system is configured to receive a first portion of a traction unit in compression between a bottom surface of the first wedge block and the internal bottom surface of the first wedge receiver. In one example, the coupling system is configured to receive a second portion of a traction unit in compression between a bottom surface of the second wedge block and the internal bottom surface of the second wedge receiver.

The coupling system may be arranged wherein the first wedge receiver and second wedge receiver are formed as a unitary structure.

The coupling system may further comprise a median portion extending between the first wedge receiver and the second wedge receiver.

The coupling system may be arranged wherein the coupling system is configured to attach to the core strands of the tire traction device.

The coupling system may further comprise: a surface defining a first cable tie receiver on the first wedge block; a surface defining a second cable tie receiver on the second wedge block; and a cable tie in tension between the first cable tie receiver and second cable tie receiver.

The coupling system may be arranged wherein each wedge block is formed of a material having a Shore durometer rating in the D scale. This is just one range for one example and wedge blocks of wider ranges of durometer ratings may also be effective.

The coupling system may be arranged wherein each wedge block receiver is formed of a material having a Shore durometer rating in the D scale. This is just one range for one example and wedge block receivers of wider ranges of durometer ratings may also be effective.

Also disclosed is a tire traction device removably attached to a vehicle tire or wheel, the traction device comprising: a tread portion comprising a tread surface. The tread portion of one example comprising a first material. The tire traction device in one example also comprising a plurality of sidewall portions, the sidewall portions comprising a second material. In one method of manufacture, the tread portion and sidewall portions are cast in a single mold as a unitary structure.

The tire traction device may be formed wherein the first material comprises rubber and the second material comprises urethane or an especially formulated urethane material to reduce slipping in wet conditions. The tire traction device as recited wherein the core is a fiber-reinforced component.

The tire traction device may further comprise a circumferentially extending core in each transverse side of the tire traction device.

BRIEF DESCRIPTION OF THE DRAWINGS

FIG. 4a is a side elevation view of the prior art tire traction device shown in FIG. 3.

FIG. 4b is a top plan view of the prior art tire traction device shown in FIG. 3.

FIG. 4c is a bottom plan view of the prior art tire traction device shown in FIG. 3.

FIG. 4d is an end elevation view of the prior art tire traction device shown in FIG. 3.

FIG. 5 is an end perspective view of a wedge block component of the coupling device.

FIG. 6 is an end perspective view of a wedge receiver component of the coupling device.

FIG. 7 is an end perspective view of a wedge block component of the coupling device from an angle opposed to that shown in FIG. 5.

FIG. 8 is and end perspective view of a wedge block component of the coupling device from an angle opposed to that shown in FIG. 7.

FIG. 9 is a perspective view of a prior art zip tie component of the coupling device.

FIG. 14 is a cutaway view of a tire traction device being produced in a mold.

DESCRIPTION OF THE PREFERRED EMBODIMENTS

Figure 1:
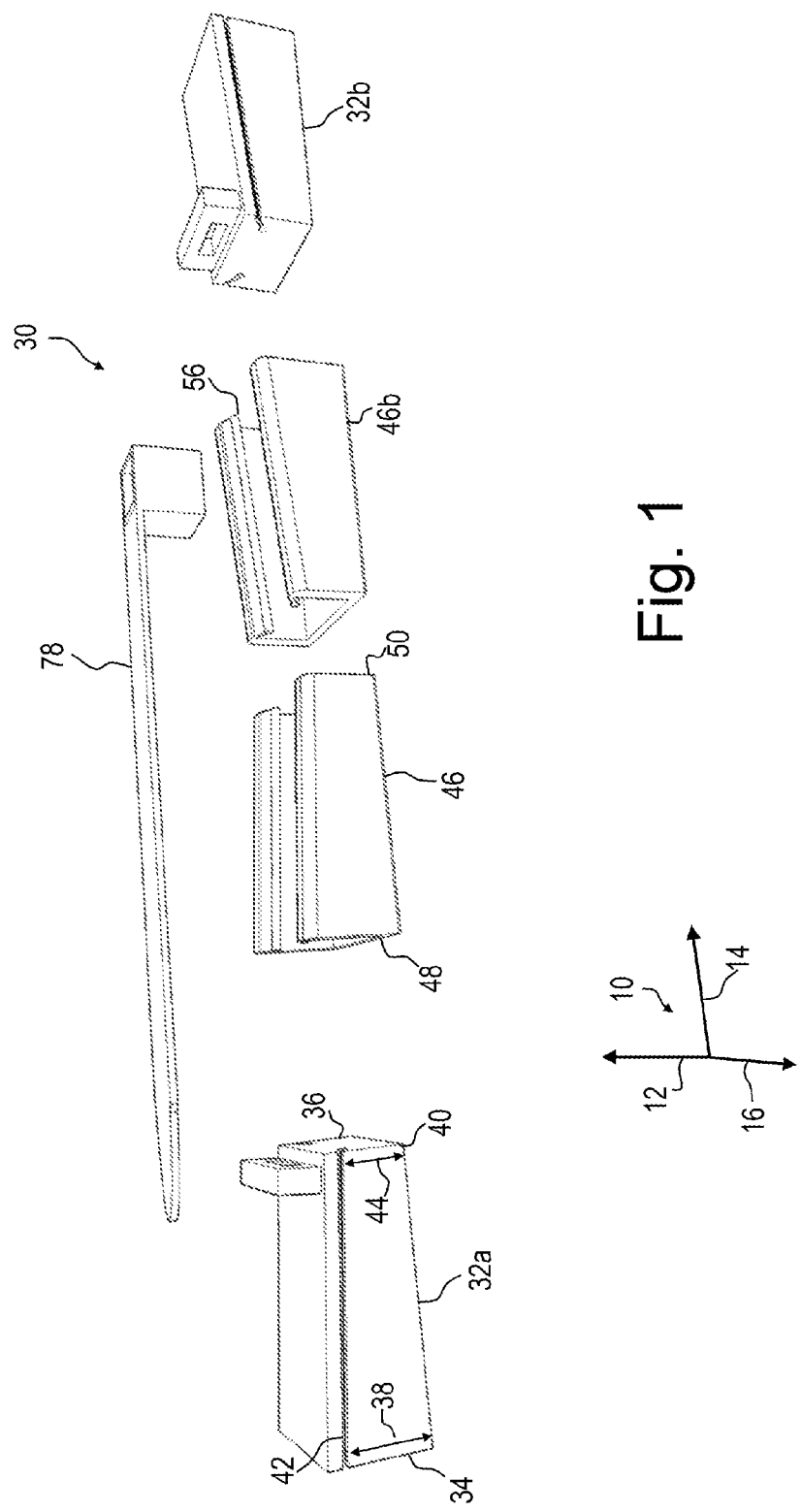
FIG. 1 is a perspective view of a coupling device in accordance with the disclosure.

Looking to FIGS. 3, 4a-4d is shown a prior art design for a tire traction unit. This traction unit 20 has a radially outward tread surface 22 and laterally opposed sidewall surfaces 24. Also generally shown is a core strand 26. The ornamental design of this device was disclosed in U.S. Design Pat. No. 325,896 incorporated herein by reference. Disclosed herein are modifications and novel improvements to the tire traction unit 20. Also disclosed is a coupling 30 in several examples which is used to attach opposing ends of the tire traction unit 20 about a tire as is shown for example in FIG. 2.

Figure 13:
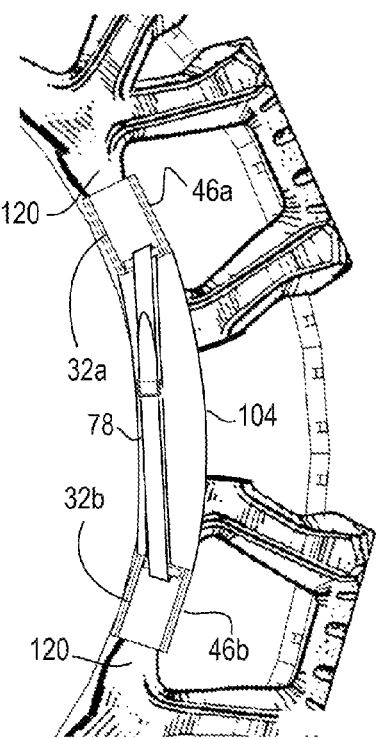
FIG. 13 is a parallel projection view of the coupling device of FIG. 11 in use on a tire traction device.

Looking to FIG. 1, one example of a new coupling 30 can be shown comprising a first wedge block 32a, and a second wedge block 32b. These wedge blocks 32a and 32b interoperate with wedge block receivers 46a and 46b respectively as will be explained in more detail. FIG. 13 shows one example of wedge block receivers 46a and 46b, interconnected at a median portion 104. In one form, the wedge blocks 32 are formed of a polymer (plastic) having a durometer harness to rubber and with similar friction qualities to the wedge receivers 46. In one form the wedge block receivers 46 are formed (cast) of a hard resilient plastic material. Alternatively, the wedge block receivers 46 may be cast or otherwise machined or extruded from metals or other materials.

In this disclosure, a numbering system is utilized wherein a general component is identified with a numeric label, and specific examples of each generic component have an alphabetic suffix. For example, a general wedge block may be identified by the label 32 whereas specific wedge blocks may be identified as 32a and 32b.

Before continuing a detailed description, an axes system 10 is disclosed in FIG. 1 which generally comprises a vertical axis 12, a longitudinal axis 14, and a transverse axis 16. These axes are intended to aid in description of the device and methods for using the device are not intended to be read as limitations to particular functional orientations in and of themselves.

FIG. 1 shows one example wherein the first wedge block 32a has a first longitudinal end 34 and a second longitudinal end 36. As shown, the vertical height 38 of the first end 34 measured from the bottom surface 40 to a projection contact surface or channel 42 is substantially larger than the vertical height 44 of the second end 36 measured from the bottom surface 40 to the channel 42. In FIG. 1, a first wedge receiver 46a and second wedge receiver 46b are shown, each having a first longitudinal end 48 and second longitudinal end 50. Looking to FIG. 8, it can be seen how the vertical height 52 measured between an internal bottom surface 54 and a projection 56 as measured at the first end 48 is substantially larger than the vertical height 58 measured at the second end 50 (see FIG. 6). In one form, the angle between the internal bottom surface 54 and the projection 56 along the internal side surface 60 of the wedge receiver is equal to the angle between the bottom 40 and the channel 42 of the wedge block 32.

Figure 10:
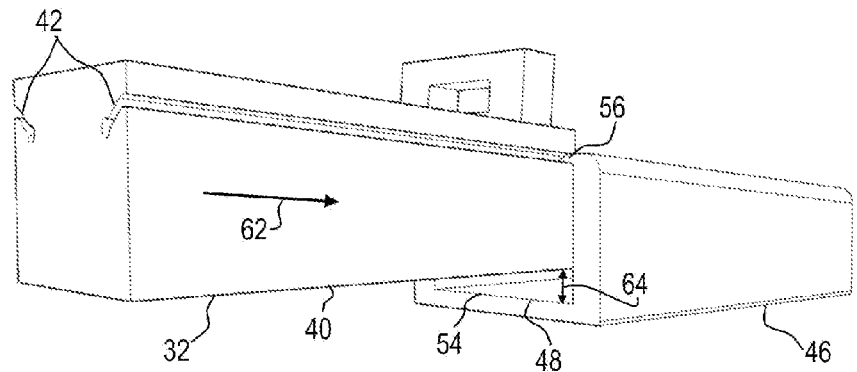
FIG. 10 is a perspective view of a wedge block and wedge receiver.

Looking to FIG. 10, it can be seen how in this example, as the wedge block 32 is inserted into the wedge receiver 46 at a first hand 48, a gap 64 exists between the bottom 40 of the wedge block 32 and the internal bottom surface 54 of the wedge receiver 46. In this way, when the wedge block 32 is completely inserted into the wedge receiver 46, the gap 64 there between is reduced. In one form, this gap may be completely closed when the wedge is fully inserted. Provided that the final gap is smaller than the (non-compressed) portion of the tire traction device 20 to be clamped therein, attachment of the coupling to the tire traction device will be effective. As the wedge block and/or clamped portion of the tire traction device in one example are compressible, a very effective clamping force may be achieved. When in use upon the tire traction unit 20, a portion of the tire traction unit, such as the core strand 26, may be placed against the internal surface 54, the wedge block 32 may then be positioned so that the channels 42 engage projections 56. As the wedge block 32 is repositioned longitudinally along direction of travel 62 relative to the wedge receiver 46, the gap 64 between the bottom surface 40 of the wedge block 32 in the upper internal surface 54 of the wedge receiver 46 decreases, "clamping" that portion of the tire traction unit 20 there between in place. The core strand 26 may comprise a fibrous material such as rope, cord, cable, etc.

Figure 2:
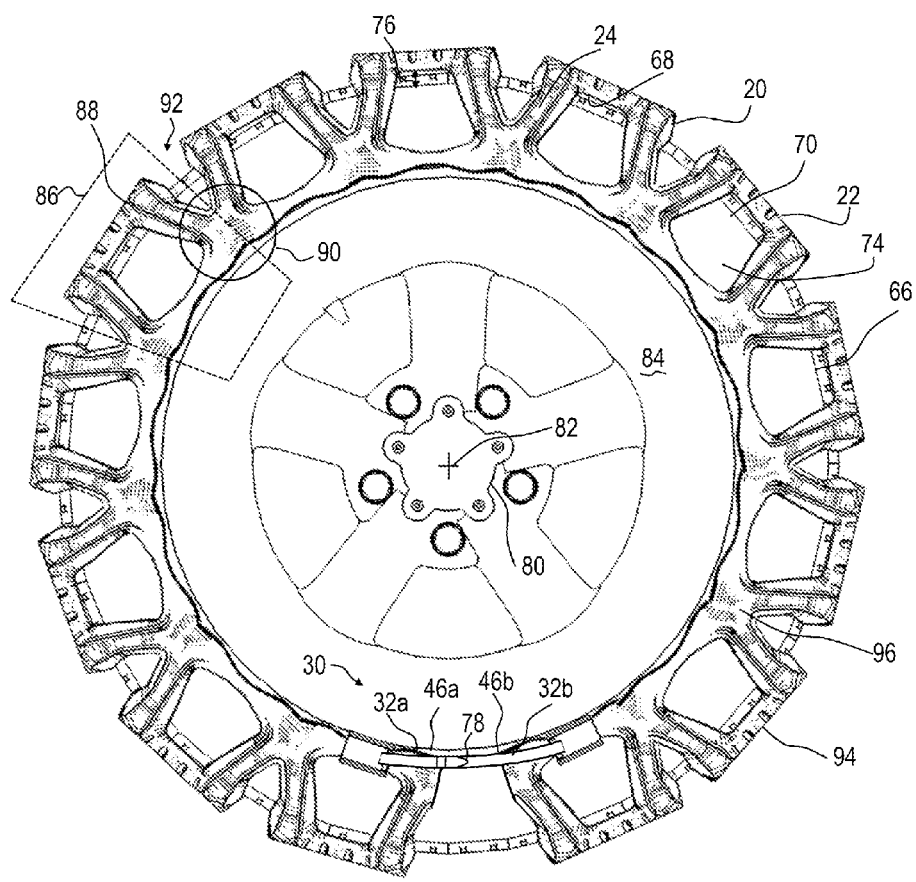
FIG. 2 is a parallel projection view of a coupling device in accordance with the disclosure in use.

Looking to the example shown in FIG. 2, it can be seen how a traction unit 20 has been placed about a tire 66 such that an inner surface 68 of the traction unit 20 is adjacent a tire tread surface 70. This may be accomplished while the tire is inflated. Likewise, an inner sidewall surface 72 of the tire traction device 20 is positioned adjacent a tire sidewall surface 74. In this position, a small gap 76 may exist between the inner surface 68 and the tire tread surface 70 until the coupling 30 is completely engaged, and tensioned.

Also shown in the example of FIG. 2, a cable tie 78 can be utilized to draw the wedge blocks 32A and 32B together and maintain them in place upon the wedge receivers 46a and 46b. As shown in FIG. 9, such cable or zip ties generally comprise a head 106 and a tail 108 which generally terminates in a tapered point 110. In use, the point 110 is inserted into the head 106 where detents on the tail 108 engage a pawl within the head 106 to allow a ratcheting one-way movement of the tail 108 within the head 106. When the tie 78 is properly tensioned, the portion of the tail 108 extending from the head 106 may be cut, twisted, or torn off. When removal is desired, the tie 78 is generally cut off as it is generally not convenient to release the pawl within the head and the overall cost of such ties 78 is very low.

Figure 12:
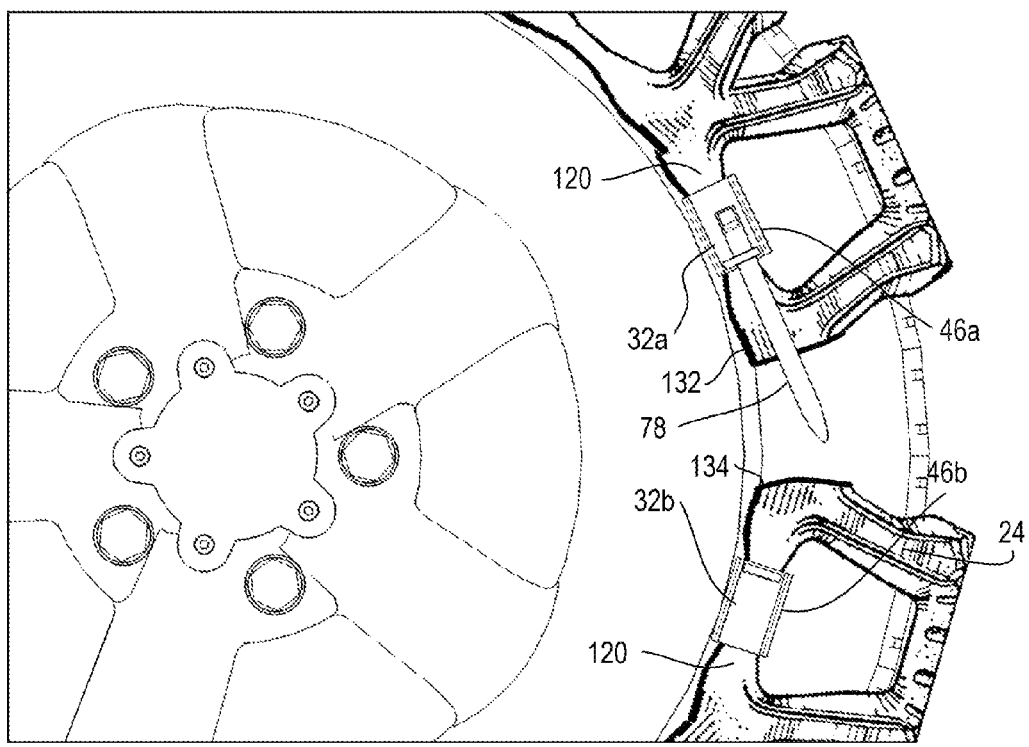
FIG. 12 is a parallel projection view of the coupling device of FIG. 1 in use on a tire traction device.

In the example shown in FIG. 12 for example, the tie 78 may be a heavy duty type tie as a large tension force may be required to hold the separate wedge receivers 46 in relative position. The wedge receivers 46a and 46b attached to the first circumferential end 132 and second circumferential end 134 of the traction device 20 so as to removably couple these two ends together. The tie 78 generally holds most or all of the tension exerted by the traction device 20. In the example shown in FIG. 13, the median portion 104 of the coupling device may take a great deal of the tension, and a lighter weight tie 78 may be utilized.

To facilitate attachment of the tie 78 to each of the wedge blocks 32, a tie receiver 112 having a tie receiving surface 114 may be provided on each of the wedge blocks 32.

Figure 3:
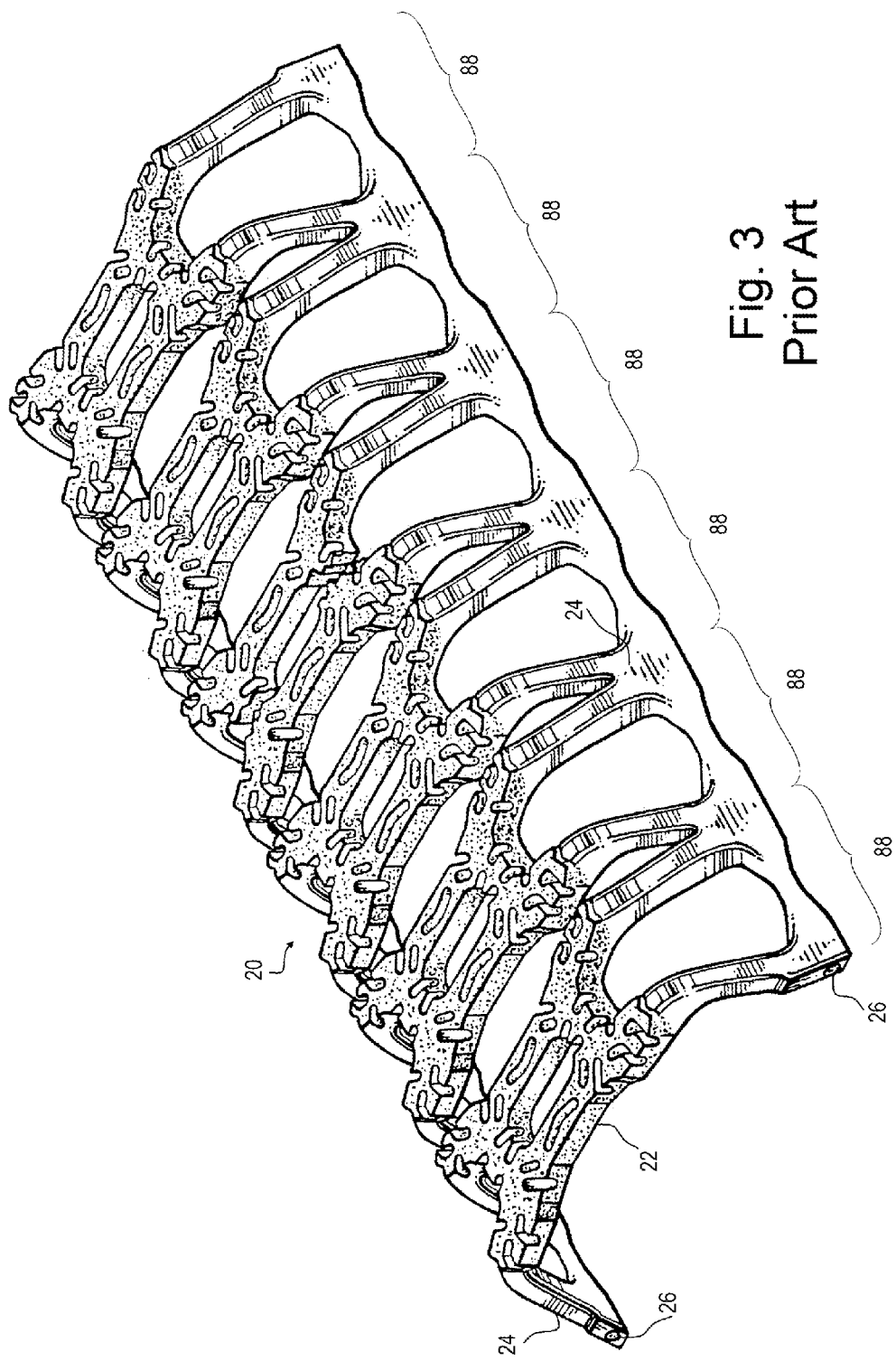
FIG. 3 is a top perspective view of a prior art tire traction device.

Once the tie 78 is properly tensioned, the gap 76 between the inner surface 68 and tire tread surface 22 will generally close and the traction unit 20 will be firmly held in place upon the tire 66. What cannot be seen in FIG. 2 is that a coupling 30 is normally used on either transverse (inner and outer) side of the tire 66. Also, while in FIGS. 2, 12, and 13 the coupler 30 is positioned such that the cable tie 78 is on the transverse outward side of the tire 66 such that it faces away from the tire sidewall surface 74, alternatively the coupling could be positioned for example such that the cable tie 78 faces inward toward the hub 80 or axis 82 of the wheel 84 upon which the tire 66 is mounted. Alternatively, the coupling could be positioned for example such that the cable tie 78 faces outward, radially away from the hub 80 or axis 82 of the wheel 84 upon which the tire 66 is mounted Looking to FIG. 4a, it can be understood that this example of the tire traction unit 20 comprises a series of segments 88 defined by the region 86. Each segment 88 is interconnected to an adjacent segment 88 at a pivot region 90. As can be seen in FIG. 2 of this example there may be little flex of each segment 88 however, the gap 92 and flexibility of the device at each pivot region 90 allows adjacent segments 88 to pivot relative to each other about the pivot region 90. In one form, the tire traction unit is cast in a single mold as generally shown in FIG. 3. The tire traction unit is cast as a longitudinal production having a tread surface 22 and sidewalls 24 extending radially inward (see FIG. 2) with a core strand 26 in either side of the sidewall 24. While the traction unit 20 as shown in FIG. 3 comprises six segments 88, the apparatus can be made with fewer or more segments 88 and the individual lengths of the segments 88 may be adjusted for different ranges of tires.

Figure 15:
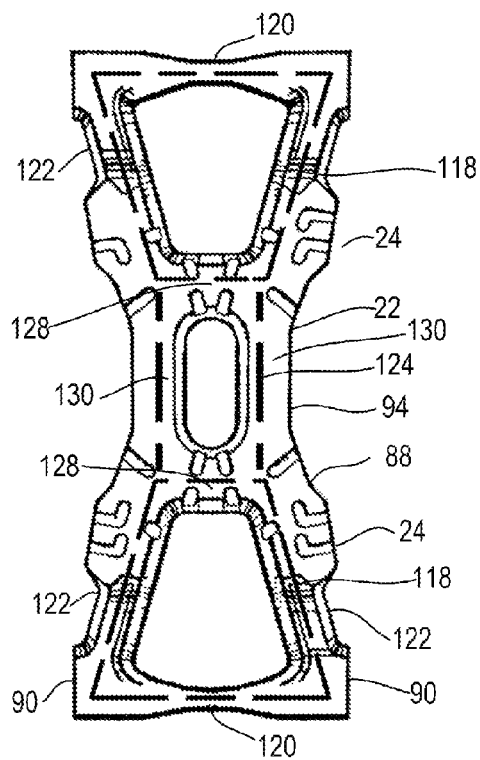
FIG. 15 is a top view of one example of a segment of a tire traction device.

Looking to FIG. 2, it can be understood that each segment 88 in this example comprises a pair of sidewalls 25. Each sidewall may comprise a circumferential base 120 having a core element 26 therein and a pair of legs 122. The base 120 and legs 122 of each sidewall 24 generally form a (truncated) triangle (trapeziod) 119 formed by the base (circumferential member) 120, legs 122, and longitudinal member 128. The pad 94 generally comprises a (rounded) rectangle (oval) 12 formed by longitudinal members 128 and transverse members 130. As can be clearly seen in the example of FIG. 15, each (rounded) rectangle (oval) 124 need not extend to the sidewall portion 24. As can be clearly seen in the example of FIG. 15, each (truncated) triangle (trapeziod) 118 need not extend to the tread surface or pad portion 94. These components cooperate to form a well-supported structure, which has been found to be very stable even at high speeds and in extended use.

The arrangement of the tire traction device into segments 88 connected by pivot regions 90 allows for the tire traction device to be produced, shipped, and sold. The material comprising the segments 88 may be produced by a continuous mold or complex extrusion into a component much longer than necessary for use. The material may then be rolled, shipped, and stored. When a particular application is desired, the portion of the material may be cut from the whole and used. For example, a customer wishing a tire traction unit 20 for a particular tire/wheel size combination may inform a salesperson of such. The salesperson may then reference a chart or other indicator to determine the number of segments required for such a particular application, and this number of segments 88 will be cut from the material 88 and provided to the customer along with the required couplers. This process also reduces inventory, as separate traction devices need not be stocked for every common tire/wheel size.

As shown in FIGS. 2, 12 and 13, it will generally be desired to attach the coupling device such that the coupling (cable tie) overlies two adjacent radial members of adjacent segments. This will generally make the coupling stronger than where the coupling 30 does not overlie such radial members.

The common materials from which modern tires are made include synthetic rubber, natural rubber, etc. Fabric and wire, along with other compounds and chemicals may be used for longevity and tension strength. Prior art wire traction devices are commonly made of chains, cables, and similar metallic and hard components which are attached to the tread surface 22 of a tire 66 in many different ways to temporarily improve traction, such as in snowy or icy road conditions.

Disclosed herein is a tire traction device which is used in a manner similar to prior art chains and cables. The disclosed tire traction device is produced as a product similar to a tire tread, in that the tire traction device does not significantly negatively impact the tire nor the road surface. In addition the device may be made more cheaply than cable/chain applications. The disclosed device also facilitates early installation, as the device does not significantly reduce driving speeds, control of the vehicle or damage the vehicle as chain/cable applications often to. Testing on closed tracks has shown that even at sustained speeds of up to 125 mph can be safely achieved without detrimental effects to the vehicle or traction device when properly produced and installed. As cables, chains metallic studded tires etc. are very hard, they tend to cause significant wear and tear on a road surface and are therefore significantly limited in the times in which they can be used. For example, many states have laws regulating that such tire traction devices only be used in the winter months. By utilizing a rubber or urethane like material for the tire traction unit number 20, it is suspected that such regulations could be overcome. This would allow for the tire traction units 20 to add life to the tires 66 as well is to be utilized at those times when chain/cable/studded traction units are not allowed.

Looking to FIG. 2 one example of a tire traction unit 20 is disclosed as being produced of a novel process in which pads 94 including the tread surface 22 are formed of a first material and a side portion 96 including the sidewall's 24 is formed of a second material. For example, the pads 94 may be formed of rubber such as natural rubber. The side portions 96 may be produced of a similar rubber material for example having different strength characteristics and/or different durometer hardness and may include fabric strands, metal strands such as cables etc. therein for longevity and added tensile strength. In addition, colorants may be incorporated into one or both of the portions. For example, orange colorants could be utilized in the side portion 96 when the traction device is cast to add a distinctive look to the apparatus such that it could be easily determined from a distance that the traction unit 20 were in place about a tire 66. As the disclosed tire traction device 20 is very similar to some tire treads, it may be otherwise difficult to distinguish from a tire tread at a distance without some additional indicator.

By utilizing a urethane sidewall portion 96 and rubber traction pad 94 when properly installed, it has been found that speeds of up to 125 mph can be accomplished without detrimental separation of the traction unit 20 from the tire 66. As is well known, utilizing cable or chain style traction units results in localized separation of the tire 66 from the traction unit at speeds generally above 15-30 mph. One caution must be made in that in some applications, urethane uses water as a lubricant. Therefore, wherein the sidewalls have urethane on the external surface thereof, in wet such as rainy situations, the urethane may be slippery and not form an adequate traction surface to the roadbed. As the tire normally does not utilize the sidewalls as a traction surface, this is generally not an issue when urethane sidewalls are used.

In one form, all or portions of the pad portion 94 may be cast separately from the side portions 96. For example, the pads 94 (as best seen in FIG. 4B) maybe cast independently and later placed into a mold along with optional core strands 26. At this point, the side portions 96 may be formed by pouring a material into the mold adjacent to be preformed pads 94 until the material comprising the side portion 96 as completely cured or at least adequately cured to allow removal of the traction unit 20 from the mold 98.

Another method of production involves the steps of pouring the pad portion 94 including radially outward (tread) surface 136 of a first material 100 such as natural or synthetic rubber in one example up to line 126, allowing the pad portion 94 to heat set and then heating the mold. In one form the mold is heated to 115°. In another step, a second material 102 is injected or poured into the mold to form the sidewalls 24. As previously discussed, the second material may be urethane. If the pad portions 94 are pre-made prior to placement into the mold such that they are substantially cured prior to installation, a bonding agent may be applied to the surface of such a pre-made pad such that when the second material 102 is injected to the mold 98, the second material 102 will properly bond to the preformed pad.

Figure 11:
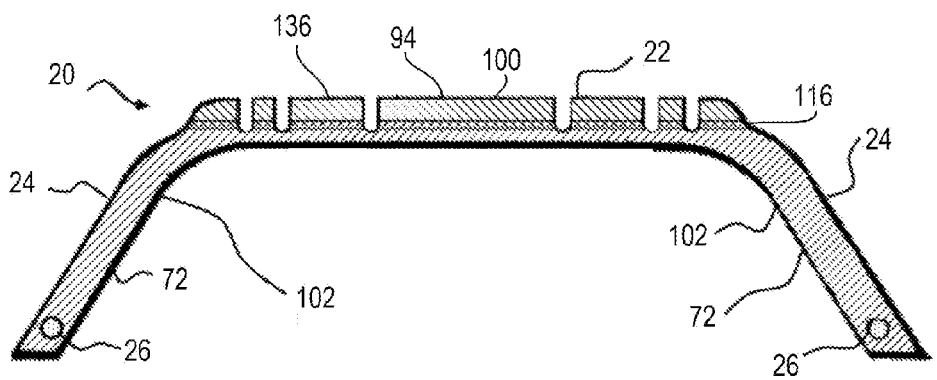
FIG. 11 is a cutaway view of one example of the disclosed tire traction device.

In the example shown in FIG. 11, the arrangement of the first material 100 and second material is slightly different from that shown in the example of FIG. 14. In addition, a fibrous material 116 may be cast in the median therebetween. The fibrous material 116 may be a woven Kevlar® material, or similar product to increase stability of the traction device, especially for use on emergency vehicles, or at high speed.

Yet another method of production is accomplished by pouring the pad portion 94 and prior to a full cure of the pad portion 94, the sidewall portions 24 are also poured into the mold 98 wherein both the pad portion 94 and sidewall portions 24 cure substantially simultaneously. Wherein core strands 26 are molded into the sidewall portions 24, a may be held in tension between longitudinal ends of the mold 98 as the sidewalls 24 are poured in cured.

In one form, once the pad portion is poured, it is allowed to cure for a certain period of time prior to pouring of the sidewall portion. This one form, the pad portion is allowed to cure for 8-10 minutes prior to pouring of the sidewall portion.

In one form, the pad and/or sidewall comprises polyurethane.

A cable tie, also known as a zip tie or tie-wrap, is a type of fastener, commonly used for binding several electronic cables or wires together and to organize cables and wires.

The term malleable used herein to define a material which is pliable or able to be deformed under pressure without breaking.

In one common form, the nylon cable tie consists of a tape section (tail) with triangular teeth that slope in one direction. The head of the cable tie has a slot with a flexible pawl that rides up the slope of these teeth when the tape is inserted. The pawl engages the backside of these teeth to stop removal of the tape.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. A tire traction device removably attached to a vehicle tire while inflated, the traction device comprising:
   a. a tread portion comprising a tread surface, the tread surface being a radially outward surface of the tire traction device, the tread surface comprising a first material;
   b. an interlinked monocast structure comprised of a plurality of sidewall portions;
   c. the sidewall portions having an outermost surface;
   d. the sidewall portions comprising a second material;
   e. wherein the first material and second material are different compositions;
   f. wherein the first material does not substantially extend to the sidewall portions;
   g. wherein the tread portion and sidewall portions are a unitary structure; and
   h. the tire traction device comprising a first circumferential end and an opposing circumferential end removably coupled to the adjacent first circumferential end via a coupling system.

2. The tire traction device as recited in claim 1 wherein the first material comprises rubber and the second material comprises urethane.

3. The tire traction device as recited in claim 1 further comprising a circumferentially extending core in each sidewall portion.

4. The tire traction device as recited in claim 3 wherein the core is a fiber-reinforced component.

5. The tire traction device as recited in claim 1 further comprising a fibrous material substantially disposed between the first material and the second material.

6. The tire traction device as recited in claim 1 wherein second material extends into the tread portion.

7. A coupling system for a tire traction device as recited in claim 1, the coupling system comprising:
   a. a first wedge block having a first longitudinal end having a vertical height and a second longitudinal end a vertical having a vertical height wherein the vertical height of the first end is larger than the vertical height of the second end;
   b. the first wedge block having a surface defining a tie receiver;
   c. a second wedge block having a first longitudinal end having a vertical height and a second longitudinal end a vertical having a vertical height wherein the vertical height of the first longitudinal end is larger than the vertical height of the second longitudinal end;
   d. the second wedge block having a surface defining a tie receiver;
   e. a first wedge receiver having an internal bottom surface, transversely opposed side surfaces, and transversely opposed projections;
   f. the first wedge receiver having a first end longitudinal end and a second longitudinal end wherein the vertical distance between the internal bottom surface and the transversely opposed projections at the first longitudinal end of the first wedge receiver is greater than the vertical distance between the internal bottom surface and the transversely opposed projections at the second longitudinal end of the wedge receiver;
   g. a second wedge receiver having an internal bottom surface, transversely opposed side surfaces, and transversely opposed projections;
   h. the second wedge receiver having a first end longitudinal end and a second longitudinal end wherein the vertical distance between the internal bottom surface and the transversely opposed projections at the first longitudinal end of the second wedge receiver is greater than the vertical distance between the internal bottom surface and the transversely opposed projections at the second longitudinal end of the wedge receiver;
   i. wherein the coupling system is configured to receive a first portion of a traction unit in compression between a bottom surface of the first wedge block and the internal bottom surface of the first wedge receiver; and j. wherein the coupling system is configured to receive a second portion of a traction unit in compression between a bottom surface of the second wedge block and the internal bottom surface of the second wedge receiver.

8. The coupling system as recited in claim 7 wherein the first wedge receiver and second wedge receiver are formed as a unitary structure.

9. The coupling system as recited in claim 8 further comprising a median portion extending between the first wedge receiver and the second wedge receiver.

10. The coupling system as recited in claim 7 wherein the coupling system is configured to attach to core strands of the tire traction device.

11. The coupling system as recited in claim 7 comprising:
   a. a surface defining a first cable tie receiver on the first wedge block;
   b. a surface defining a second cable tie receiver on the second wedge block; and
   c. a cable tie in tension between the first cable tie receiver and second cable tie receiver.

12. The coupling system as recited in claim 7 wherein each wedge block is formed of a malleable material having a Shore durometer rating in the D Scale.

13. The coupling system as recited in claim 7 wherein each wedge block receiver is formed of a non-malleable material having a Shore durometer rating in the D scale.

14. A tire traction device removably attached to a vehicle tire while inflated, the traction device comprising:
   a. a plurality of segment regions, each segment region comprising:
      (i) a tread portion comprising a tread surface, the tread portion having an opening there through which does not extend to a sidewall portion of the traction device;
      (ii) the tread portion comprising a first material;
      (iii) the opening defined by a plurality of longitudinal members of the tread portion and a plurality of transverse members of the tread portion;
      (iv) a plurality of the sidewall portions, each sidewall portion comprising a surface defining a substantially trapezoidal opening which does not extend to the tread surface;
      (v) the sidewall portion comprising a second material;
      (vi) wherein the first material and the second material are different compositions;
      (vii) each trapezoidal opening having a radially outward side formed by one of the longitudinal members of the tread portion;
   b. wherein the tread portion and sidewall portions are a unitary structure.

* * * * *